United States Patent Office 3,537,991
Patented Nov. 3, 1970

3,537,991
DRILLING FLUIDS AND ADDITIVES THEREFOR
Harry W. Parker, Bartlesville, Okla., assignor to Phillips Petroleum Company, a corporation of Delaware
No Drawing. Filed Dec. 27, 1966, Ser. No. 604,579
Int. Cl. C10m 3/48, 3/34
U.S. Cl. 252—8.5
9 Claims

ABSTRACT OF THE DISCLOSURE

Drilling fluid additives consisting essentially of a first agent which is a heat-treated sulfoalkylated tannin in the form of its alkali metal or ammonium salt, and a second agent selected from the water-soluble compounds of chromium. Said additives are added to aqueous drilling fluids to reduce at least one of (a) the yield point or (b) the 10-minute gel of said drilling fluid.

---

This invention relates to drilling fluids and additives therefor.

In the drilling of wells with rotary tools and using an aqueous drilling mud or fluid there are major difficulties caused by natural formations penetrated. One of these difficulties is the encountering of certain formations, such as gypsum, which will "cut" the drilling mud so that the clay particles are flocculated and the viscosity becomes too high. In such instances there is danger of the drill pipe twisting in half, or of gas cutting of the mud, or of a blowout occurring due to the cutting of the mud. Another difficulty which is frequently encountered in deeper wells is gelation and/or thickening of the drilling mud due to the higher temperatures encountered in said deeper wells. In such instances the drilling mud actually gels and/or thickens, greatly increasing the pump pressures required for circulating the drilling mud. In severe cases it becomes practically impossible to properly circulate the mud. Furthermore, said high temperature gelation is frequently aggravated by the presence of contaminants such as gypsum, salt, cement, etc., in the drilling mud. Thus, another requirement for drilling muds is that they be characterized by stability and the higher temperatures encountered in deeper wells.

Recently there has been provided a new class of additives for drilling fluids, which additives when incorporated in aqueous drilling fluids, e.g., water base drilling fluids and oil-in-water emulsion drilling fluids, provide a solution for the above and other problems and impart enhanced viscosity or other enhanced rheological characteristics to said drilling fluids. Said new additives are combination additives comprising an additive agent No. 1, e.g., a sulfoalkylated tannin, and an additive agent No. 2, e.g., the water-soluble cationic and anionic compounds of certan amphoteric metals. As disclosed and claimed in copending application S.N. 491,830, filed Sept. 30, 1965, by J. C. Floyd and F. J. Shell, now Pat. 3,479,287, issued Nov. 18, 1969, said additive agent No. 1 and said additive agent No. 2 cooperate in a synergistic manner to impart reduced yield point values, reduced gel values, or other improved rheological properties to a drilling fluid having the combination additive incorporated therein.

I have now discovered that the action of said combination additives on drilling fluid properties can be markedly improved by subjecting said sulfoalkylated tannin to a heat treatment, either alone or in admixture with said additive agent No. 2.

An object of this invention is to provide an improved drilling fluid. Another object of this invention is to provide an improved drilling fluid having enhanced viscosity or other enhanced rheological characteristics. Another object of this invention is to provide improved aqueous drilling fluids which are characterized by stability to the high temperatures encountered in drilling deep wells. Another object of this invention is to provide new additives for use in aqueous drilling fluids, e.g., water base drilling fluids and oil-in-water emulsion drilling fluids, which additives will impart enhanced viscosity or other enhanced rheological characteristics to said drilling fluids. Another object of this invention is to provide methods of using said improved drilling fluids in the drilling or workover of wells. Other aspects, objects, and advantages of the invention will be apparent to those skilled in the art in view of this disclosure.

Thus, according to the invention, there is provided a drilling fluid additive comprising a mixture of: a heat-treated sulfoalkylated tannin, as a first agent; and a second agent selected from the group consisting of the water-soluble cationic and anionic compounds of chromium, aluminum, vanadium, titanium, zinc, manganese, and mixtures thereof; the weight ratio of said first agent to said second agent in said additive being within the range of from 20:1 to 1:1.

Further according to the invention, there is provided an aqueous drilling fluid comprising water, and sufficient finely divided solids to form a filter cake on the wall of the well, and to which there has been added one of said combination additives of the invention in an amount sufficient to reduce at least one of (a) the yield point, and (b) the 10-minute gel of said drilling fluid but insufficient to increase the viscosity of said drilling fluid to such an extent that it cannot be circulated.

Further according to the invention, there are provided methods of using the improved well drilling fluids of the invention, which methods comprise circulating said well drilling fluids into and from the bore hole in contact with the wall of said bore hole.

It will be noted that in the combination drilling fluid additives of the invention the additive agent No. 1, i.e., the sulfoalkylated tannin, has been subjected to a heat treatment. Said heat treatment can be carried out in any suitable manner which is effective to improve the action of said additive. One method comprises placing the dried sulfoalkylated tannin in a suitable container and then placing the container in an oven maintained at a suitable temperature for a suitable period of time. If desired, the sulfoalkylated tannin can be passed through an oven or other suitable heating means on a belt or other suitable conveyor means. Another method comprises heating the sulfoalkylated tannin in a fluidized bed employing a hot gas as fluidizing medium. Said heat treatment can be carried out at a temperature within the ragne of from 250 to 475, preferably about 300 to about 400° F. for a period of time within the range of from about 0.5 to about 24, preferably about 1 to 16, hours. Since said sulfoalkylated tannins are organic compounds, it is preferred, but not essential, that said heat treatment be carried out with minimum contact with air or other oxidizing medium.

Heat-treated sulfomethylated quebracho is the presently preferred sulfoalkylated tannin for use as said additive agent No. 1. The ammonium, sodium, and potassium chromates and dichromates are presently preferred for use as said additive agent No. 2.

Tannins which can be used in preparing the sulfoalkylated tannins used in the practice of the invention are the vegetable tannins, including both the gallotannins and the flavotannins (sometimes called catechol tannins). Thus, the word "tannin" as used herein and in the claims, unless otherwise specified, refers to and includes the vegetable gallotannins and the vegetable flavotannins. Examples of the gallotannins include: tannic acid or Chinese tannin; Turkish tannin; hamamelis tannin; acer-tannin; glucogallin; sumac tannin; valonia oak gall tannin; tea tannin; tara; myrabolam; divi-divi; algarobillo; oak; and chestnut. Examples of flavotannins include: gambier and catechu or Burma cutch; quebracho; tizerah; urunday; wattle; mangrove; spruce; hemlock; larch; willow; and avaram. Said flavotannins are the presently preferred tannins for use in accordance with the invention.

Quebracho is the presently most preferred tannin. Quebracho is extracted from the bark and wood of the quebracho tree with water. The conventional method of preparing quebracho is to disintegrate the wood and bark, extract the bark and/or wood with water, the solution of quebracho and water is evaporated to 85 percent concentration of quebracho and the concentrated quebracho is spray dried. Quebracho is the commercial catechol tannin or flavotannin product. The high tannin content (about 20 percent) of the wood of the quebracho tree makes it the important source of catechol tannins. The principal source of gallotannins is gall nuts.

The sulfoalkylated tannin, either a gallotannin or a flavotannin, can be prepared by several different procedures. All of said procedures involve the interreaction, in an alkaline aqueous reaction medium under reaction conditions, between a tannin compound, a carbonyl compound selected from the group consisting of aldehydes and ketones, and a sulfur compound selected from the group consisting of sulfurous acid and water-soluble salts thereof. Thus, in one method an alkali metal hydroxide, e.g., sodium hydroxide, an aldehyde or ketone, e.g., formaldehyde or acetone, a sulfide, e.g., sodium sulfite, or sodium bisulfite, and a tannin, e.g., quebracho (quebracho extract), are added to water in a reaction vessel to form a reaction mixture. The sequence of adding said reactants to the water is not critical. However, it is sometimes preferred to add the alkali metal hydroxide first. The amount of alkali metal hydroxide employed will be an amount sufficient to make the reaction mixture alkaline, at least initially. Said reaction mixture is then maintained under conditions of time and temperature sufficient to cause the substantial conversion of the tannin compound into a sulfoalkylated tannin.

If desired, the carbonyl compound, e.g., formaldehyde or acetone, and the sulfite can be prereacted. In one method, for example, a solution containing formaldehyde and sodium sulfite is prepared separately and then combined with the tannin in the alkaline reaction medium. Thus, in one preferred method for preparing said sulfoalkylated tannin, an alkaline first solutinn is prepared by dissolving a tannin (such as quebracho extract), and an alkali metal hydroxide (such as sodium hydroxide) in water. A second solution is formed by admixing a carbonyl compound (such as formaldehyde) and a sulfite (such as sodium bisulfite) in water. Said second solution is then added to said first solution to form a third solution. Said third solution is then maintained at an elevated temperature for a period of time sufficient for at least a substantial portion of said aldehyde and saidsulfite to react with said tannin to form a sulfoalkylated tannin. In this instance, using the exemplary reactants mentioned above, the product is sulfomethylated quebracho.

In another preferred method for preparing the sulfoalkylated tannin used in the practice of the invention, the desired amount of water is added to a reactor vessel equipped with suitable stirring means. The desired amount of carbonyl compound (such as formaldehyde) is then added to said water with stirring. The desired amount of a sulfite (such as sodium bisulfite) is then added to the water, with stirring, and the carbonyl compound and sulfite are permitted to react to completion. Usually the reaction time will be within the range of 0.5 to 3 hours and the final temperature will be in the order of 125° F., depending upon the initial ambient temperature of the water, the amount of reagents, etc. The desired amount of an alkali metal hydroxide (such as sodium hydroxide) is then added. The tannin compound (such as quebracho) is then added to the tank containing the above reagents with vigorous stirring. Heating is initiated and the solution is maintained at an elevated temperature which is preferably within the range of 180 to 200° F. for a period of from 1 to 6 hours. After the sulfoalkylation reaction is complete the sulfoalkylated tannin is recovered as a dried solid from the reaction solution in any suitable manner, such as by evaporation, drum drying, or spray drying. Operation of the drum dryer or spray dryer at elevated temperatures within the above-described range of temperatures for the heat treatment affords still another method for carrying out the heat treatment of the sulfoalkylated tannin. Thus, the hot sulfoalkylated tannin can, if desired, be passed to a suitable storage bin and maintained at heat treating temperatures for a sufficient period of time.

The vegetable tannins are high molecular weight materials having molecules of complex structure containing phenolic hydroxyl groups. Some authorities consider said tannins to be mixtures of polyphenolic substances. So far as is known all of said tannins contain at least one aromatic (e.g., benzene) ring having at least one phenolic hydroxyl group attached thereto. Said hydroxyl groups have their hydrogen atoms replaced in alkaline solution. The reactive sites remaining on the aromatic ring structure are susceptible to sulfoalkylation to add side chain(s) to the tannin molecule.

Due to the complex nature and chemistry of the tannin compounds it is not intended to limit the invention to the above to any specific reaction mechanism, or to any specific method for preparing the sulfoalkylated tannins which are used as agent No. 1 in the additives of the invention. However, said sulfoalkylated tannins can be conveniently described in terms of processes for their manufacture. One reaction mechanism by which said sulfoalkylated tannin can be formed involves a sulfoalkylation reaction whereby the tannin molecule is alkylated by one or more sulfoalkylene radicals attached to said tannin molecule as side chains. The alkylene portion of said sulfoalkylene radical is a methylene or substituted methylene group. Thus, said side chain(s) can be represented by the formula $-C(R)_2-SO_3M$ wherein each R is selected from the group consisting of a hydrogen atom and alkyl, cycloalkyl, aryl, and alkaryl radicals, and M is ammonium or an alkali metal depending upon the particular sulfite employed. As indicated hereinafter, it is preferred when R is other than hydrogen, that said R be an alkyl group containing from 1 to 5 carbon atoms.

As indicated above, the reactions involved in the preparation of the sulfoalkylated tannins used in the practice of the invention are carried out in an alkaline aqueous medium. Hydroxides of the alkali metals sodium, potassium, lithoum, rubidium, and cesium can be used to make said medium alkaline. The amounts of said hydroxides used can be varied over a wide range. The principal function of said hydroxide is to impart sufficient initial solubility to the raw tannin so that it can react with the sulfite and aldehyde or ketone reactants in the sulfoalkylation reaction. In order to obtain practical reaction rates for said reaction, the pH of the reaction medium should be about 10. In any event, enough of the hydroxide is used to make the initial pH of the reaction medium at least 7, and preferably 10 to 13. However, large excesses of the hydroxide above the amount required to initially solubilize the raw tannin should be avoided for best results. When sulfurous acid and a bisulfite are used as the sulfur compound, sufficient hydroxide should be present to convert these to the sulfite form. If desired, the alkali metal hydroxide can be prereacted with the tannin prior to the addition of the other reactants to the reaction medium.

Carbonyl compounds which can be used in preparing said sulfoalkylated tannins include any aldehyde or ketone containing a $>C=O$ group, the carbon atom of which is capable of becoming a methylene or substituted methylene group. Thus, aldehydes and ketones which can be used can be represented by the formula $(R)_2C=O$ wherein R is as defined above. Since said R is nonfunctional in the reaction, there is no real limit on what it is or the number of carbon atoms which it contains. However, when R is unduly large, solubility problems in the aqueous reaction medium and also in connection with the solubility of the reaction product are encountered. The larger R groups tend to make the product hydrophobic. In general, this is undesirable when the products are used in the additives of the invention. Thus, since it is preferred to carry out the reaction in an aqueous medium, it is preferred as a practical matter that when R is not hydrogen, it is an alkyl group containing from 1 to 5 carbon atoms, more preferably 1 to 3 carbon atoms.

Examples of said preferred aldehydes and ketone include: formaldehyde, acetaldehyde, propionaldehyde, n-butyraldehyde, isobutyraldehyde, n-valeraldehyde, acetone, methyl ethyl ketone, diethyl ketone, methyl n-propyl ketone, and methyl isopropyl ketone.

The sulfur compound used in preparing said sulfoalkylated tannins is, in general, sulfurous acid and its water-soluble salts such as the alkali metal salts and including the ammonium salts. The alkali metal (as defined above) sulfites are preferred. It is pointed out that when a bisulfite or sulfurous acid is added to the alkaline reaction medium, it will be converted to a sulfite. Therefore, herein and in the claims, unless otherwise designated, the term "sulfite" is employed generically to include sulfurous acid and bisulfites which, when added to the alkaline reaction medium, will be converted to and react as sulfites.

The amounts of the above-described reactants which are used are not critical. So long as a significant amount of each of said reactants is present, the desired reactions will proceed to some extent and some yield of sulfoalkylated tannin will be obtained. The amounts of each reactant used will depend upon the amount, the kind of tannin, and the percentage of conversion of said tannin which is desired. For results approaching the optimum, it is preferred to use amounts of said reactants which are within the range of from 0.5 to 1.5 times the stoichiometric equivalent amount of each reactant which is required to completely react the tannin. Amounts of said reactants which are less than stoichiometric result in less than 100 percent conversion. Amounts in excess of stoichiometric result in a waste of material. Thus, it is preferred to use substantially stoichiometric equivalent amounts of said reactants. For example, the amount of sulfite and aldehyde or ketone is preferably the stoichiometric equivalent amount required in the sulfoalkylation reaction. When the aldehyde or ketone and the sulfite are prereacted, they are preferably prereacted in stoichiometric equivalent amounts.

From the above it is seen that specific numerical ranges for the amounts of said reactants will be of only limited value in teaching this invention and it is to be understood the invention is not limited to any such specific numerical ranges. Those skilled in the art can readily determine from a few pilot experiments the stoichiometric amounts of reactants required for the particular tannin being reacted. However, as an aid to those less skilled in the art, the following ranges are set forth.

TABLE I.—AMOUNTS OF REAGENTS PER 100 LBS. OF TANNIN

| Reagent | Broad range, lbs. | Preferred range, lbs. | Preferred range for Quebracho, lbs. |
| --- | --- | --- | --- |
| Alkali metal hydroxide | 5-60 | 10-20 | 12-18 |
| Sulfite | 4-115 | 20-70 | 35-65 |
| Aldehyde or ketone | 1-60 | 5-50 | 15-36 |

The above preferred amounts of reactants can be stated in other ways. For example, when quebracho extract is the tannin being used, quebracho catechin is considered to be the active ingredient of the quebracho. Based on a molecular weight of 274 for said quebracho catechin, 100 pounds of quebracho extract will contain an average of 0.33 pound mols of quebracho catechin, and the preferred range of reagents given in column 3 of the above Table I has been established on this basis. When other tannin materials are used, the molecular weight of the active ingredient thereof, as well as the amount contained per 100 pounds of tannin, may be different. Thus, it is desirable that the quantities of reagents to be used be established for each particular tannin material used. Those skilled in the art will have no difficulty establishing the amounts of reagents to use in view of this disclosure. Any large deviation from the 0.33 mol of active ingredient in any individual lot of quebracho extract would also require an adjustment of the chemicals used for reacting with said quebracho. However, analyses of six commercially available quebracho extracts available from different sources has shown that commercial quebracho extract is surprisingly uniform in composition.

The amount of carbonyl compound, e.g., formaldehyde, and the amount of sulfite compound, e.g., sodium bisulfite, used in the reaction will determine the amount of sulfoalkylation of the tannin compound which occurs. This affords another way of expressing the amount of carbonyl compound and sulfite. The amount of sulfoalkylation which occurs in any given reaction situation can be expressed in terms of the parts by weight of the carbonyl compound-sulfite addition product of sulfoalkylation reagent e.g., $NaSO_3CH_2OH$— formed by reacting stoichiometric amounts of formaldehyde and sodium bisulfite, used per 200 parts by weight of tannin. For example, expressed in this manner and when using formaldehyde, sodium bisulfite, and quebracho, the most preferred amounts of sodium formaldehyde bisulfite addition product will be within the range of from 50 to 175 parts by weight of the sulfomethylation reagent per 200 parts by weight of quebracho.

In general, the reaction conditions are not critical. All the reactions involved in preparing said sulfoalkylated tannins will take place at ordinary room temperatures (70–80° F.) but at a reduced rate and all reaction conditions at which the reactions will take place are within the scope of the invention. However, as a practical matter, it is preferred to employ elevated temperatures to cause said reactions to take place in less time. Any suitable temperature below the decomposition temperature of the tannin can be employed. For example, the application of heat aids in dissolving quebracho in the alkaline medium. As a general rule, temperatures in the order of 125 to 212° F. are sufficient. However, usually a more preferred range is from 180 to 212° F. If desired, the reaction mixture can be refluxed at atmospheric pressure, or can be heated in an autoclave under superatmospheric pressure to obtain higher temperatures. In general, the maximum temperatures employed will be in the order of 300° F. Thus, an overall numerical range for the reaction temperatures can be said to be from 70 to 300° F.

The reaction time will be dependent upon the reaction temperature employed. Reaction times in the order of 0.5 to 10 hours have been found quite sufficient. Preferably, the reaction times will be within the range of 1 to 6, more preferably 1 to 4 hours.

Metal compounds which can be used as additive Agent No. 2 in the combination additive of the invention are the water-soluble cationic and anionic compounds of the amphoteric metals chromium, aluminum, vanadium, titanium, zinc and manganese. As used herein and in the claims, unless otherwise specified, a cationic compound of a metal is defined as a compound wherein one of said amphoteric metals is present in the cationic portion of the molecule and an anionic compound of a metal is defined as a compound wherein one of said amphoteric metals is present in the anionic portion of the molecule. Examples of said compounds include, among others, the simple salts such as the nitrates, chlorides, iodides, bromides, sulfates, etc., of said metals. Also included are the double salts such as potassium tetrachlorozincate-aluminum sulfate, sodium chromium II sulfate hexahydrate, potassium manganese II chloride hexahydrate, sodium manganese II chloride, sodium vanadium sulfate hexahydrate, zinc ammonium chloride, zinc sodium chloride, and sodium zinc sulfate hexahydrate; alums such as potassium aluminum sulfate dodecahydrate; potassium chromium sulfate dodecahydrate, and cesium titanium sulfate dodecahydrate; anionic compounds such as the alkali metal chromates or dichromates, the ammonium chromates or dichromates, alkali metal aluminates, potassium titanate, sodium titanate, sodium vanadate, ammonium metavandate, zinc dichromate, sodium zincate; and others.

In the combination additive of the invention the weight ratio of additive agent No. 1 to additive agent No. 2 is generally within the range of from 20:1 to 1:1, preferably within the range of from 12:1 to 2:1. Frequently, a weight ratio within the range of from 9:1 to 5:1 is more preferred.

The amount of the combination additives of the invention used in drilling fluids in accordance with the invention will vary from well to well depending upon conditions encountered in the drilling of the well, the characteristics of the particular drilling fluid being used, the formations being drilled, etc. For example, as the drilling of the well progresses and the well becomes deeper and temperatures in the well increase, or the drilling fluid becomes contaminated, more additive will usually be required because of said increased tempertures and/or contamination. While therefore the amount of additive used is not of the essence of the invention, it can be stated that the amount of said additive used will normally be within the range of 0.1 to 30, preferably 0.5 to 15, and more preferably 1 to 10, pounds per barrel of drilling fluid. However, it is within the scope of the invention to employ amounts of the additive which are outside said ranges. For example, the amount of additive used will always be an amount which is sufficient to effect an improvement or reduction in the rheological properties of the drilling fluid such as a decrease in yield point, 10-minute gel, or shear strength. As used herein and in the claims, unless otherwise specified, the word "barrel" refers to a barrel of 42 standard U.S. gallons.

An important advantage of the combination additives of the invention is the ease with which they can be dispersed in the water phase of aqueous drilling fluids. Said combination additives can be incorporated in said drilling fluids by merely adding same to a circulating stream of the drilling fluid. The components of said combination additives are easily pulverized solids which can be added directly as such or dry blended together, to the jet hopper commonly employed in formulating drilling fluids. The incorporation of said combination additives into the drilling fluid can be either before or during the drilling of the well. Dry blending of additive agent No. 1 and additive agent No. 2 together in a proper weight ratio and then incorporating the resulting dry blend or mixture into a circulating stream of the drilling fluid is a presently preferred method for adding said additives to the drilling fluid. If desired, said additive agents can be added to the drilling fluid separately in dry form. Said additive agent No. 1 and additive agent No. 2 can also be dispersed in water separately and the resulting separate dispersions incorporated into the drilling fluid. However, it is pointed out that additive agent No. 1 and additive agent No. 2 should not be dispersed in water together prior to incorporating same into the drilling fluid. When said additive agent No. 1 and said additive agent No. 2 are dispersed in water together in the absence of finely divided solids such as clayey materials, a firm insoluble gel forms. Surprisingly, said gel is not formed when said additive agents are incorporated in the equeous phase of a drilling fluid containing suspended finely divided solids such as clayey materials.

The following examples will serve to further illustrate the invention.

EXAMPLES

A series of test runs using the improved combination additives of the invention was made. Prior to making said test runs, a batch of sulfomethylated suebracho was prepared for use as the additive Agent No. 1. Said sulfomethylated quebracho, referred to hereinafter for convenience as SMQ, was prepared as follows. Water in the amount of 275 gallons was added to a 2100-gallon reactor tank equipped with a double-bladed stirring means. A 37 weight percent formaldehyde solution in the amount of 110 gallons was then added to the water. The resulting solution was stirred and 1300 pounds of sodium bisulfite was added thereto over a period of approximately 45 minutes. During this period the temperature of the solution increased from about 65° F. to about 120° F. After the reaction between the sodium bisulfite and the formaldehyde was completed, as evidenced by a constant temperature, approximately 35 gallons of a 50 weight percent sodium hydroxide solution was added. The temperature of the solution increased to about 150° F. At this time 2250 pounds of quebracho was added slowly over a period of about 20 to 25 minutes. During this period the temperature increased to about 200° F. and was then maintained within the range of 190° to 200° F. for approximately 2.5 hours. The tank contents were then passed to a drum dryer for recovery of the reaction product, i.e., sulfomethylated quebracho (SMQ).

A sample of the above-described SMQ, in the amount of 5 pounds per barrel, along with sodium dichromate, in the amount of one pound per barrel, was blended into a base drilling mud. The resulting unaged drilling mud composition was tested for API Code RP–13B properties unsing a Model 35 Fann V–G multispeed viscosimeter. The procedure for determination of API Code RP–13B properties employing the Fann V–G viscosimeter is described by Chisholm and Kohen, "Petroleum Engineer" 26, (4), B–87 to B–90 (April 1954). A portion of said drilling mud composition was then contaminated with Portland cement in the amount of two pounds per barrel to simulate conditions frequently encountered in acutal well operations. Said API properties were run on a sample of the unaged cement contaminated drilling mud and on a sample of said cement contaminated drilling mud after it had been aged 16 hours at 176° F. The results of all the above tests are set forth as Run No. 1 in Table II below. This Run No. 1 is a control run.

Runs 2 to 5, inclusive, in Table II were carried out in a similar manner using the same base drilling mud. In Run No. 2 the SMQ used as agent No. 1 was heat treated for 16 hours at 405° F. In Run No. 3 the SMQ was heat treated for 16 hours at 310° F. In Runs 4 and 5 the SMQ and the sodium dichromate were premixed and the resulting mixtures heat treated for 16 hours at 405° F. and 310° F., respectively. Heat treatment of the above-described materials was carried out by placing same in a Erlenmeyer flask, stoppering the flash with glass wool so as to minimize contact of the contents with air, and placing the flask in an oven for the prescribed periods of time.

The base drilling mud used in the above test runs was composed of 20 weight percent P95 rotary clay (an illitic clay) and 4 weight percent bentonite in water, and contained sufficient red barites to give a mud density of 12.2 pounds per gallon. Said base mud was prepared in a conventional manner which, in general, comprised preparing the mud in a 5-gallon batch in a suitable blending mill such as a Lear Blend–A Mill, stirring for at least 30 minutes, and then aging for at least 3 days prior to use. Just prior to use portions of the mud were contaminated with one pound per barrel of sodium chloride and 4 pounds per barrel of sulfonated asphalt and then stirred for 5 minutes. Said sulfonated asphalt is a commercially available product prepared in accordance with U.S. 3,028,333, issued Apr. 3, 1962, to C. A. Stratton et al. Sulfonated asphalts prepared in accordance with U.S. 3,089,842, issued May 14, 1963, to C. A. Stratton can also be used.

agent is within the range of from 12:1 to 2:1; and said second agent is sodium dichromate.

4. A drilling fluid additive in accordance with claim 2 wherein said second agent is sodium dichromate and said sulfomethylated quebracho is heat treated after having been mixed with said second agent.

TABLE II.—ADDITIVES IN BASE MUD AND BASE MUD CONTAINING 2 LBS./BBL. OF CEMENT CONTAMINANT

| Combination additives | | Unaged Base Mud | | | Base Mud Containing Cement, 2 lbs./bbl. | |
|---|---|---|---|---|---|---|
| Name | Lbs./bbl. | PV/YP | Gels | Aged | PV/YP | Gels |
| Run No.: | | | | | | |
| 1[1] SMQ and Na$_2$Cr$_2$O$_7$·2H$_2$O | 5 and 1 | 31/13 | 8/24 | No / Yes | 58/65 / 44/7 | 50/223 / 4/12 |
| 2 SMQ heated 16 hrs. at 405° F. and Na$_2$Cr$_2$O$_7$·2H$_2$O | do | 25/8 | 4/19 | No / Yes | 45/14 / 34/2 | 7/57 / 3/3 |
| 3 SMQ heated 16 hrs. at 310° F. and Na$_2$Cr$_2$O$_7$·2H$_2$O | do | 26/11 | 4/21 | No / Yes | 54/23 / 34/3 | 17/132 / 2/3 |
| 4 SMQ and Na$_2$Cr$_2$O$_7$·2H$_2$O premixed & heated 16 hrs. at 405° F | 4.6 and 0.92 | 28/13 | | No / Yes | 41/16 / 31/5 | 12/75 / 6/5 |
| 5 SMQ and Na$_2$Cr$_2$O$_7$·2H$_2$O premixed & heated 16 hrs. at 310° F | do | 27/14 | | No / Yes | 45/21 / 32/4 | 15/113 / 2/3 |

[1] Control run.

NOTE.—PV=Plastic Viscosity (centipoise); YP=Yield Point (lbs./100 ft.$^2$); Gels=Initial gel/10-minute gel (both in lbs./100 ft.$^2$); Aged=Aged 16 hrs. at 176° F.

Referring to the above Table II, a comparison between Runs 1 and 2 shows the improved results which are obtained when the SMQ has been heat treated. Runs 2 and 3 indicate that heat treatment at 405° F. is preferred to heat treatment at 310° F. Runs 4 and 5 show that the SMQ and sodium dichromate can be premixed and the resulting mixture then heat treated, if desired.

The combination additives of the invention can be used in a wide variety of aqueous drilling fluids, e.g., water base drilling fluids and oil-in-water emulsion drilling fluids. Further details concerning the types of drilling fluids in which said additives can be used can be found in column 4, lines 20–75, and column 5, lines 1–43, of U.S. 3,219,580, issued Nov. 23, 1965, to Charles A. Stratton.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A combination drilling fluid additive consisting essentially of a mixture of: as a first agent, a sulfoalkylated tannin in which the tannin molecule is alkylated with at least one —C(R)$_2$—SO$_3$M side chain wherein each R is selected from the group consisting of hydrogen and alkyl radicals containing from 1 to 5 carbon atoms, and M is selected from the group consisting of ammonium, and the alkali metals, and said tannin is selected from the group consisting of the gallotannins and the flavotannins, said sulfoalkylated tannin having been heat treated, in the dry state subsequent to its preparation, at a temperature within the range of from 250 to 475° F. for a period of time within the range of from 0.5 to 24 hours; and a second agent selected from the group consisting of the water-soluble inorganic compounds of chromium, and mixtures thereof, wherein the chromium can be present in the cation or anion portion of the molecule; the weight ratio of said first agent to said second agent in said additive being within the range of from 20:1 to 1:1.

2. A drilling fluid additive according to claim 1 wherein: said first agent is a sulfomethylated quebracho; and said second agent is selected from the group consisting of ammonium chromate, ammonium dichromate, sodium chromate, sodium dichromate, potassium chromate, potassium dichromate, and mixtures thereof.

3. A drilling fluid additive according to claim 2 wherein: the weight ratio of said first agent to said second 5. An aqueous drilling fluid comprising water, and sufficient finely divided solids to form a filter cake on the wall of the well, and to which there has been added a combination drilling fluid additive in accordance with claim 1 in an amount sufficient to reduce at least one of (a) the yield point, and (b) the 10-minute gel of said drilling fluid.

6. An aqueous drilling fluid comprising water, and sufficient finely divided solids to form a filter cake on the wall of the well, and to which there has been added a combination drilling fluid additive in accordance with claim 2 in an amount sufficient to reduce at least one of (a) the yield point, and (b) the 10-minute gel of said drilling fluid.

7. An aqueous drilling fluid in accordance with claim 6 wherein said second agent in said additive is sodium dichromate and said sulfomethylated quebracho is heat treated after having been mixed with said second agent.

8. In a process for the drilling of a well with well drilling tools wherein a drilling fluid is circulated in said well in contact with the wall thereof, the improvement comprising circulating in said well as said drilling fluid an aqueous drilling fluid comprising water, and sufficient finely divided solids to form a filter cake on the wall of the well, and to which drilling fluid there has been added a combination drilling fluid additive in accordance with claim 1 in an amount sufficient to reduce at least one of (a) the yield point, and (b) the 10-minute gel of said drilling fluid.

9. A process according to claim 8 wherein the total amount of said first agent and said second agent added to said drilling fluid is within the range of from 0.1 to 30 pounds per barrel of said drilling fluid; said first agent added to said drilling fluid is a sulfomethylated quebracho; said second agent is sodium dichromate; and the weight ratio of said first agent to said second agent is within the range of from 12:1 to 2:1.

References Cited

UNITED STATES PATENTS

| 2,331,281 | 10/1943 | Wayne | 252—8.5 |
| 2,605,221 | 7/1952 | Hoeppel | 252—8.5 |
| 3,244,623 | 4/1966 | King et al. | 252—8.5 |
| 3,344,063 | 9/1967 | Stratton | 252—8.5 |

HERBERT B. GUYNN, Primary Examiner